United States Patent Office 3,413,400
Patented Nov. 26, 1968

3,413,400
COLORED PHARMACEUTICAL COATING COMPOSITIONS
Samuel Lee, Fair Lawn, N.J., assignor to Geigy Chemical Corporation, Greenburgh, N.Y., a corporation of Delaware
No Drawing. Filed Aug. 27, 1964, Ser. No. 392,633
8 Claims. (Cl. 424—365)

ABSTRACT OF THE DISCLOSURE

Pharmaceutical dosage unit forms are coated with a solution comprising about .0001 to about 5% of a dispersing agent, about .01 to about 10% of a hydrophilic protective colloidal agent, from about 50 to 99% of a sugar base syrup vehicle, from about .0001 to about 5% of a water soluble F.D. and C. or D. and C. dyes, and from about .001 to about 15% of a water insoluble salt derived from an acid and a cation with an atomic number under 40 which serves as a pseudo laking agent. Upon drying of the coating composition, the pseudo lake is formed. Premature laking is prevented by the presence of the edible hydrophilic protective colloid.

---

This invention relates to a novel coating composition and a method for coating and coloring pharmaceutical dosage unit forms such as tablets, pills, pellets and the like.

The previously used method for pan coating and coloring pharmaceutical dosage unit forms such as tablets, pills, pellets and the like with a colored sugar coating have remained substantially unchanged for years, regardless of the fact that they are time-consuming, taking from 40–60 steps to produce the desired coating. These prior art dye coating methods are also troublesome in that the colors are difficult to reproduce and the colors produced show poor light stability.

Customarily, coating processes are divided into five different unit operations, each of which consists of a multiplicity of steps. These operations are:

(1) Waterproofing and sealing
(2) Subcoating
(3) Rounding and smoothing
(4) Coloring and finishing
(5) Polishing and branding The first operation of waterproofing and sealing is included only when the medicinal agent is sensitive to the hydrolytic action of the water in the coating vehicle. Likewise the last operation of polishing and branding is not directly involved with this invention, although it has been found that this last procedure is greatly facilitated by the subject invention. Subcoating involves alternately wetting the tablets with an adhesive subcoating solution while they are tumbling over each other in a conventional rotating coating pan. In the smoothing and rounding operation, the tablets are replaced in a clean coating pan which is then rotated. While the tablets are tumbling over each other, sufficient warm, smoothing syrup to cover each tablet with a thin uniform film is added. Often as many as 20 or 30 steps are required during this operation to achieve adequate smoothing and rounding.

The fourth operation of coloring and finishing is particularly important, as imperfections in color are readily detectable and cause instant rejection of a batch. It is in this step that the subject process differs distinctly from the prior art procedures. The subject process utilizes a pseudo lake as a coloring medium as opposed to the conventional dyes. The conventional dyes of the prior art procedures are particularly unstable. This is true during storage or exposure to light and humid atmospheric conditions. The dye containing compositions of the prior art are especially unstable when pastel shades are used and when blends of two or more dyes are used to produce a desired shade. The pseudo lakes of the subject invention stabilize the coloring dye or dyes to such a degree that pastel shades can be readily used and the selective fading of one dye in a dye mixture is prevented.

Attempts have been made to overcome the problems of the prior art but with little success. For example, United States Patent No. 2,925,365 discloses a process for the coating of pills, tablets, etc. wherein a prepared lake is used as a coloring medium. While this process tends to reduce the composite number of coating steps, it is extremely difficult to reproduce desired colors from batch to batch. This problem results from the fact that the coating bath consists essentially of a prepared lake and a sugar solution. The prepared lake forms a coarse, uneven suspension with the sugar solution and as such the colors produced are uneven and difficult to reproduce. The composition and method of the subject invention are easily distinguished from these prior art precesses in that a prepared lake is not used as a coloring medium. Instead a pseudo lake is used as a coloring medium, said pseudo lake being produced in a situ upon drying from a pseudo laking agent on a water soluble dye.

The composition and method of this invention are advantageous over the prior procedures in that the number of steps required for coating is reduced by as much as 80%. Likewise by the composition and method of the subject invention, colors can be consistently reproduced by semi-skilled operators and the colors exhibit improved light stability.

The coloring medium of the subject invention comprises any water soluble non-toxic dye, particularly any dye derived from coal tar which is certified as suitable for human consumption. A single concentration of each dye employed is utilized in the subject composition and method. Therefore the color hues and shades are easily reproducible and thus the coating operation is not solely dependent on the skill of the operator.

The composition of the subject invention comprises the following:

|  | Percentages |
|---|---|
| F.D. and C. or D. and C. dyes | From about .0001 to about 5. |
| Pseudo laking agent | From about .001 to about 15. |
| Coating vehicle | From about 50 to about 99. |
| Colloidal material | From about .01 to about 10. |
| Dispersing agent | From about .0001 to about 5. |

The F.D. and C. or D. and C. dye is present within the recited ranges in such quantities that the desired shade of color is produced.

The pseudo laking agent is present in a stoichiometric relationship or greater. The pseudo lakes of the subject coating composition may be defined as a mixture of a water soluble dye with a water insoluble colorless material which does not form a physico-chemical compound as in the case of a true lake. Nevertheless the pseudo lake acts as a lake through stabilization of the dye against ultraviolet degradation and migration. Unlike a true lake, the dye remains water soluble during the coating process and even after the coating is dryed. Substances which serve as pseudo laking agents in the subject composition and method are non-toxic, water insoluble salts wherein the cation has an atomic number of under 40, expecially salts produced by the reaction of calcium, magnesium, strontium, aluminum, iron, zirconium and zinc; and as acid such as decanoic, dodecanoic, tetradecanoic, hexadecanoic, octadecanoic, octadecenoic, octadecadienoic, octadecatrienoic, carbonic, phosphoric, etc.

Premature pseudo laking is prevented by the presence of an edible, hydrophilic protective colloid which, upon drying, alows the pseudo laking to proceed. Among the water soluble protective colloids suitable for use in the subject invention are cellulose ethers such as methyl cellulose and hydroxy ethyl cellulose; cellulose esters such as carboxy methyl cellulose; natural carbohydrates such as water soluble salts of alginic acid, acacia and amylo pectin; and protein colloids such as casein and albumin.

The coating vehicle comprises a 50% or greater solution or suspension of sucrose, glucose, dextrose, lactose, fructose, soribtol or other innocuous materials and mixtures thereof in a volatile solvent such as water, alcohol and the like.

The dispersing agent is a water soluble, non-toxic F.D.A. approved surfactant such as sodium 2-ethylhexane sulfonate, sodium di[2-ethylhexyl]-phosphate, sodium salt of sulfate ester of an alkyl phenoxy polyoxyethylene ethanol, oleic acid ester of sodium isethionate, sodium N-methyl-N-acyl taurate (commercially available mixture), sodium salt of sulfonated lauryl and myristyl collamide, sodium salt of sulfated lauryl and myristyl collamide, sodium alkyl aryl sulfonate (commercially available mixture), dioctyl sodium sulfosuccinate, sodium lauryl sulfate, potassium cetyl sulfate, sodium oleyl sulfate, soduim stearate, potassium oleate and the like.

In preparing the coating composition the dye is dissolved in a portion of the water. The pseudo laking agent is then dispersed in the remainder of the water which also contains the dispersing agent and protective colloid. These are then mixed to form the lake precursor and the syrup added thereto.

Coating with the subject composition is accomplished by application of a coating composition containing one or more F.D. and C. or D. and C. dyes and a pseudo laking agent. Alternately, the process can be carried out by the application of a coating composition containing the F.D. and C. or D. and C. dyes and a separate coating composition containing a dispersed pseudo laking agent. During coating, the subject composition is advantageous in that the buildup in the coating pan is at a minimum.

The following examples specifically illustrate coating compositions and coating procedures which are adapted to this invention. These examples are submitted by way of illustration and not limitation.

EXAMPLE 1

| Composition: | Grams |
|---|---|
| F.D. and C. yellow No. 6 | 16.0 |
| F.D. and C. red No. 2 | 1.1 |
| F.D. and C. blue No. 2 | 4.4 |
| Aluminum octadecanoate | 50.0 |
| Calcium carbonate | 180.0 |
| Sodium lauryl sulfate | 10.0 |
| Hydroxy ethyl cellulose | 10.0 |
| Simple syrup, U.S.P. | 600.0 |
| Water | 200.0 |
| | 1000.0 |

Procedure:

The dyes are dissolved in half of the water and the soduim lauryl sulfate in the other half. The calcium carbonate and the aluminum octadecanoate are dispersed in the lauryl sulfate solution and the hydroxy ethyl cellulose dissolved therein by agitation. These solutions are mixed with part of the syrup to form the stock color base. This is further diluted with the remainder of the syrup to form the coating composition. One million 100 mg. oxyphenbutazone tablets may be coated to an attractive tan shade in one hour, with all the coating compound going on the tablets and only a negligible buildup of coating material on the inside of the coating pan being observed.

EXAMPLE 2

| Composition: | Grams |
|---|---|
| F.D. and C. violet No. 1 | 2.0 |
| Calcium hexadecanoate | 40.0 |
| Dicalcium phosphate | 80.0 |
| Dioctyl sodium sulfosuccinate | 8.0 |
| Acacia | 70.0 |
| Sucrose | 650.0 |
| Water | 450.0 |
| | 1000.0 |

Procedure:

The dyes are dissolved in a small portion of the water and the surfactant dissolved in the remainder of the water. The calcium compounds and the acacia are dispersed in the surfactant solution to prevent flocculation of the insolubles. The sucrose is then dissolved in this mixture and the dye solution added thereto. A coating vehicle is obtained which will uniformly coat a batch of tablets to a beautiful lavender shade in less than ten coating steps.

EXAMPLE 3

| Composition: | Grams |
|---|---|
| F.D. and C. red No. 3 | 3.0 |
| F.D. and C. yellow No. 6 | 2.0 |
| Magnesium tetradecanoate | 100.0 |
| Sodium alkyl aryl sulfonate | 20.0 |
| Sodium caseinate | 40.0 |
| Sorbitol | 200.0 |
| Simple syrup, U.S.P. | 800.0 |
| | 1000.0 |

Procedure

The F.D. and C. dyes are dissolved in the sorbitol solution. The sodium alkyl aryl sulfonate and sodium caseinate are dissolved in the syrup and the magnesium tetradecanoate dispersed therein. The coating mixture is obtained by blending the sorbitol dye solution with the syrup suspension. This mixture will afford a uniform reproducible orange color to a batch of tablets rotating in a conventional coating pan in a minimum number of steps.

EXAMPLE 4

| Composition: | Grams |
|---|---|
| F.D. and C. blue No. 1 | 4.0 |
| F.D. and C. yellow No. 5 | 2.0 |
| Zinc dodecanoate | 80.0 |
| Potassium oleate | 20.0 |
| Sodium alginate | 10.0 |
| Glucose | 200.0 |
| Water | 400.0 |
| Sucrose | 600.0 |
| | 1000.0 |

Procedure

The dyes are dissolved in a small portion of the water and the potassium oleate is dissolved in the remainder of the water. The zinc dodecanoate is dispersed in the potassium oleate solution and the sodium oleate dissolved therein. The sucrose is dissolved in this mixture, warmed if necessary, and then mixed with the glucose and dye solution. This affords a stable green-blue coating to a batch of tablets, rotating in a conventional coating pan.

EXAMPLE 5

| Composition: | Grams |
|---|---|
| F.D. and C. red No. 3 | 5.0 |
| Iron hexadecanoate | 50.0 |
| Magnesium carbonate | 100.0 |
| Potassium cetyl sulfate | 20.0 |

Composition:                              Grams
    Carboxy methyl cellulose _____ 20.0
    Sucrose _____ 400.0
    Lactose _____ 400.0
    Water _____ 400.0
                                          ———————
                                          1000.0

Procedure

The dye is dissolved in a small portion of the water. The potassium cetyl sulfate is dissolved in the remainder of the water and the iron and magnesium salts dispersed in this solution. The carboxy methyl cellulose is dissolved in this mixture and the sucrose and lactose incorporated therein. When the dye solution is mixed with this solution, a coating vehicle is obtained which affords a stable red coating with outstanding resistance to fading.

EXAMPLE 6

Composition:                              Grams
    F.D. and C. yellow No. 5 _____ 4.0
    Strontium octanoate _____ 40.0
    Tricalcium phosphate _____ 100.0
    Oleic ester of sodium isethionate _____ 26.0
    Methyl cellulose _____ 30.0
    Sucrose _____ 800.0
    Water _____ 450.0
                                          ———————
                                          1000.0

Procedure

The dye is dissolved in a small portion of the water. The oleic ester of sodium isethionate is dissolved in the remainder of the water along with the strontium octanoate and calcium phosphate. The methyl cellulose is added with agitation. Finally, the sucrose is dissolved in this mixture and the mixture is added to the color solution. A coating vehicle is obtained which produces a bright yellow, uniform and reproducible coating on a batch of compressed tablets in a conventional coating pan after ten steps.

What is claimed is:

1. A composition for the coating of pharmaceutical dosage unit forms consisting essentially of (a) from about .0001 to about 5 parts of a water soluble non-toxic dye, (b) from about .001 to about 15 parts of a salt produced by the reaction of (1) a member selected from the group consisting of calcium, magnesium, strontium, aluminum, iron, zirconium and zinc; and (2) an acid selected from the group consisting of decanoic, dodecanoic, tetradecanoic, hexadecanoic, octadecanoic, octadecenoic, octadecadienoic, octadecatrienoic, carbonic and phosphoric; (c) from about .0001 to about 5 parts of a water soluble non-toxic dispersing agent, (d) from about .01 to about 10 parts of an edible hydrophilic protective colloid, and (e) from about 50 to about 99 parts of a sugar base syrup.

2. A composition for the coating of pharmaceutical dosage unit forms consisting essentially of (a) from about .0001 to about 5 parts of a water soluble non-toxic dye, (b) from about .001 to about 15 parts of a salt produced by the reaction of (1) a member selected from the group consisting of calcium, magnesium, strontium, aluminum, zinc, virconium and zinc; and (2) an acid selected from the group consisting of decanoic, dodecanoic, tetradecanoic, hexadecanoic, octadecanoic, octadecenoic, octadecadienoic, octadecatrienoic, carbonic and phosphoric; (c) from about .0001 to about 5 parts of a water soluble nontoxic dispersing agent selected from the group consisting of sodium 2-ethylhexane sulfonate, sodium di[2-ethylhexyl]-phosphate, sodium salt of sulfate ester of an alkyl phenoxy polyoxyethylene ethanol, oleic acid ester of sodium isethionate, sodium N-methyl-N-acyl taurate, sodium salt of sulfonated lauryl and myristyl collamide, sodium salt of sulfated lauryl and myristyl collamide, sodium alkyl aryl sulfonate, dioctyl sodium sulfosuccinate, sodium lauryl sulfate, potassium cetyl sulfate, sodium oleyl sulfate, sodium stearate, and potassium oleate, (d) from about .01 to about 10 parts of an edible protective coloid and (e) from about 50 to about 99 parts of a sugar base syrup.

3. A composition for coating pharmaceutical dosage unit forms consisting essentially of (a) from about .0001 to about 5 parts of a water soluble non-toxic dye, (b) from about .001 to about 15 parts of a salt produced by the reaction of (1) a member selected from the group consisting of calcium, magnesium, strontium, aluminum, iron, zirconium and zinc; and (2) an acid seletced from the group consisting of decanoic, dodecanoic, tetradecanoic, hexadecanoic, octadecanoic, octadecenoic, octadecadienoic, octadecatrienoic, carbonic and phosphoric; (d) from about .0001 to about 5 parts of a water soluble non-toxic dispersing agent selected from the group consisting of sodium 2-ethylhexane sulfonate, sodium di[2-ethylhexyl]-phosphate, sodium salt of sulfate ester of an alkyl phenoxy polyoxyethylene etahanol, oleic acid ester of sodium isethionate, sodium N-methyl-N-acyl taurate, sodium salt of sulfonated laurly and myristyl collamide, sodium salt of sulfated laurly and myristyl collamide, sodium alkyl aryl sulfonate, dioctyl sodium sulfosuccinate, sodium lauryl sulfate, potassium cetyl sulfate, sodium oleyl sulfate, sodium stearate and potassium oleate, (d) from about .01 to about 10 parts of an edible protective colloid selected from the group consisting of methyl cellulose, hydroxy ethyl cellulose, carboxy methyl cellulose, water soluble salts of alginic acid, acacia, casein and albumin, and (e) from about 50 to about 99 parts of a sugar base syrup selected from the group consisting of sucrose, glucose, dextrose, lactose, fructose, sorbitol and mixtures thereof.

4. The composition of claim 3 wherein (b) is calcium octadecanoate.

5. The composition of claim 3 wherein the water soluble non-toxic dispersing agent is potassium oleate.

6. The composition of claim 3 wherein the protective colloid is hydroxy ethyl cellulose.

7. The composition of claim 3 wherein the sugar base is a glucose-sucrose base syrup.

8. A composition for the coating of pharmaceutical dosage unit forms consisting essentially of (a) from about .0001 to about 5 parts of a water soluble non-toxic dye, (b) from about .001 to about 15 parts of calcium octadecanoate, (c) from about .0001 to about 5 parts of potassium oleate, (d) from about .01 to about 10 parts a hydroxy ethyl cellulose and (e) from about 50 to about 99 parts of a glucose-sucrose base syrup.

References Cited

UNITED STATES PATENTS

| | | | |
|---|---|---|---|
| 2,566,200 | 8/1951 | Hickey | 167—82.8 X |
| 2,693,436 | 11/1954 | Spradling | 167—82 |
| 2,693,437 | 11/1954 | Spradling | 167—82 |
| 2,925,365 | 2/1960 | Nicholson et al. | 167—82 |
| 2,947,756 | 8/1960 | Hoefner | 167—82 X |
| 2,954,323 | 9/1960 | Endicott et al. | 167—82 |

ALBERT T. MEYERS, *Primary Examiner.*

V. C. CLARKE, *Assistant Examiner.*